(No Model.)
A. GRAFTON.
CRANE.
No. 305,807. Patented Sept. 30, 1884.
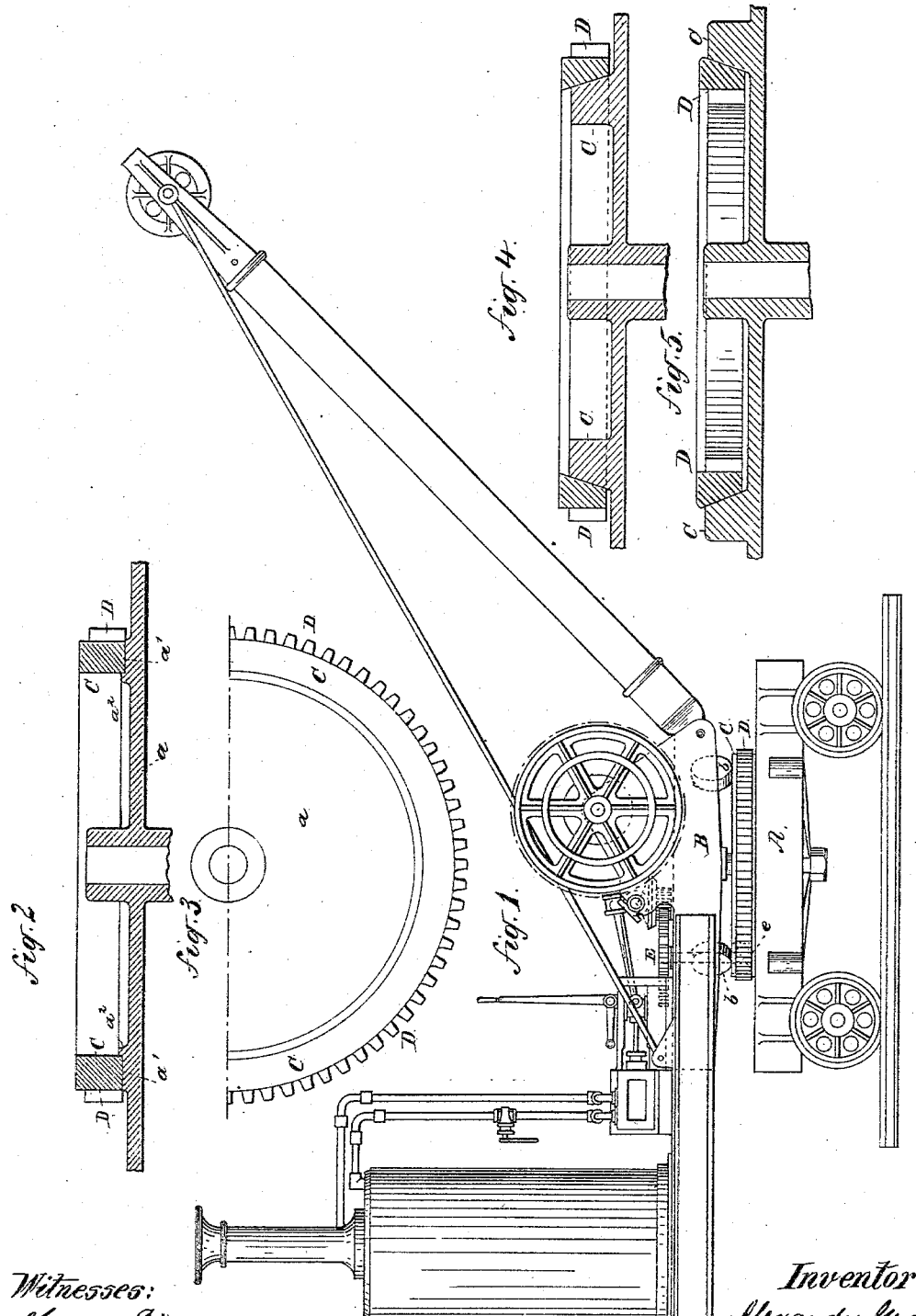
Witnesses:
Inventor
Alexander Grafton

UNITED STATES PATENT OFFICE.

ALEXANDER GRAFTON, OF LONDON, ENGLAND.

CRANE.

SPECIFICATION forming part of Letters Patent No. 305,807, dated September 30, 1884.

Application filed April 8, 1884. (No model.) Patented in England August 28, 1882, No. 4,102; in France February 28, 1883, No. 154,001, and in Belgium March 15, 1883, No. 60,610.

*To all whom it may concern:*

Be it known that I, ALEXANDER GRAFTON, of the city of London, England, have invented a new and useful Improvement in Cranes, of which the following is a specification, reference being had to the accompanying drawings, forming part of the same.

My invention relates to the sluing or rotating gear of that class of steam, hand, or power cranes which revolve on a roller-path and are tied down by a central bolt, as distinguished from those which are suspended from a column, and that are slued or rotated by toothed gearing acting upon a horizontal toothed wheel or ring; but toothed gear so used is liable to breakage by any sudden strain. To avoid or lessen this strain is the purpose of my invention. I accomplish this object by making the said toothed wheel or ring with which the said toothed gear meshes separate from but resting on the bed of the machine, and restrained by friction from rotating thereon. This separate toothed ring may itself constitute the roller-path resting on the bed-plate, the surfaces of the ring and the bed-plate in contact being horizontal planes; or the roller-path may be formed of a projection on the bed-plate and the ring constructed and arranged to rest down upon a conical surface, either on the inside or outside of the said projection. I prefer, however, the former arrangement.

In the drawings, Figure 1 is an elevation of a crane embodying my invention. Fig. 2 is a cross-section of the externally-toothed ring, itself constituting the roller-path, showing also a part of the bed or foundation plate. Fig. 3 is a part plan of the same. Fig. 4 is a cross-section of the bed or foundation plate, having the roller-path formed on it, and the separate externally-toothed ring fitting externally on a cone-seat on the bed; and Fig. 5 is a cross-section of the converse arrangement—that is to say, the said ring toothed internally and fitting internally on the said cone-seat.

A is the under carriage, and B the revolving superstructure, of the crane.

D is the toothed ring, and $a$ the foundation-plate, of the under carriage.

In Figs. 1, 2, and 3 the said ring D is externally toothed and made to constitute the roller-path on which the rollers $b$, that support the superstructure, roll in the sluing of the crane, the said ring having its upper and under faces turned off plane and parallel. It rests loose upon a turned seat, $a'$, on the bed $a$. The raised flange $a^2$ serves to retain the ring C in position while allowing it to revolve on its seat, the weight of the superstructure and its load creating sufficient friction to prevent the said ring from being caused to slip by the normal sluing action of the sluing-gear. Should, however, any undue strain be caused by the swing of the load or the quick stoppage or reversal of the sluing gear, the ring then slips, thus relieving the gear and avoiding breakage. This occasional shifting of the ring on its seat insures its wearing evenly all round, although the crane may not be required to slue through the entire circle.

A pinion, $e$, on a shaft, E, gears into the ring D, and by its rotation on its axis travels around the said ring, thus sluing or rotating the superstructure B. This pinion receives its motion from the crank-shaft, preferably through double friction-cones and bevel and spur gear, as shown.

Now, referring to Fig. 5, C is the roller-path cast solid with the bed-plate $a$, and the ring D has its teeth formed on its inner face. The shaft E and its pinion $e$ must now, of course, be arranged to mesh with the internally-formed teeth. The said ring is turned conical vertically to fit upon a corresponding conical seat formed on the inner face of the projection C, constituting the roller-path formed on the bed $a$. In Fig. 4 the ring is external to the roller-path C, and the teeth are formed on its outer face, and the conical surface is formed on the outer face of the projection C. The angle of the cone in each case, as shown in the drawings, is such that the necessary friction is obtained by the mere weight of the ring; or the angle may be such that the weight of the ring requires to be supplemented by some additional weight, in which case a portion of the weight of the superstructure may be made to rest on the ring.

By either of the above forms of construction, which I regard as equivalents of each other, I obtain the necessary amount of frictional resistance to enable the crane to be slued without, however, opposing sufficient resistance to sudden or heavy sluing strains to cause any of the gearing to break. This frictional independent ring, or ring and roller-path, has the advantage of, first, preventing breakage of the toothed gear by the sudden starting or stopping of the sluing-gear or the sudden sluing or stopping of the crane-jib by contact with any external object; second, equalizing the wear on the roller-path and toothed ring by causing the same to be moved round slightly from time to time; third, facilitating the renewal of the roller-path and ring when worn out without sacrificing the whole foundation or bed plate.

What I claim as my invention, and desire to secure by Letters Patent, is—

1. The combination of the sluing-gear and the under carriage of a crane with the described bed, and the separate toothed ring resting upon the bed and restrained in its rotation thereon by friction between the said ring and bed, substantially as and for the purpose described.

2. The combination, in a crane, with the sluing-gear, of the independent movable roller-path and toothed ring united and interposed between the under carriage and superstructure, as and for the purpose described.

3. In a sluing or rotating crane, the combination of the fixed roller-path and separate movable toothed ring, the two fitting together, as and for the purpose described.

ALEXANDER GRAFTON.

Witnesses:
A. G. N. VERMILYA,
ROBERT JACKSON.